April 15, 1958 — V. M. MATHEWS, JR., ET AL — 2,831,156
AMPLIFYING ALTERNATOR
Filed Feb. 2, 1955 — 4 Sheets-Sheet 1

INVENTORS.
Victor M. Mathews, Jr.
Richard W. Fetter
BY
ATTORNEY.

INVENTORS.
Victor M. Mathews, Jr.
Richard W. Fetter
BY
ATTORNEY

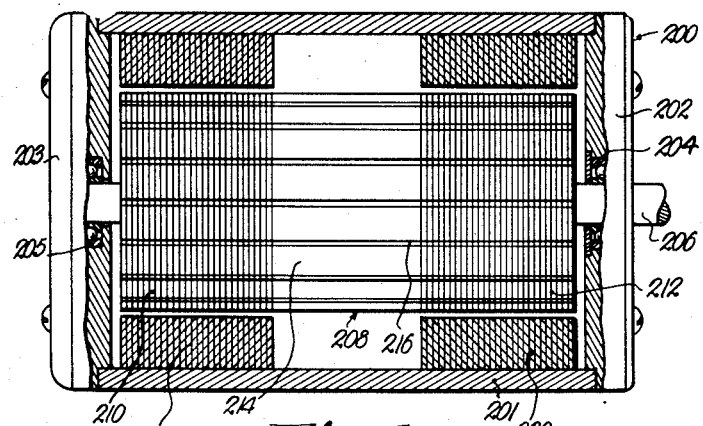
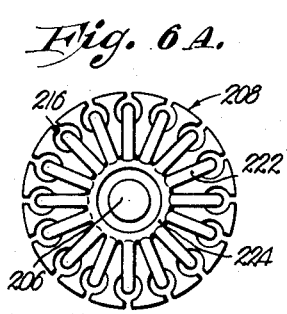
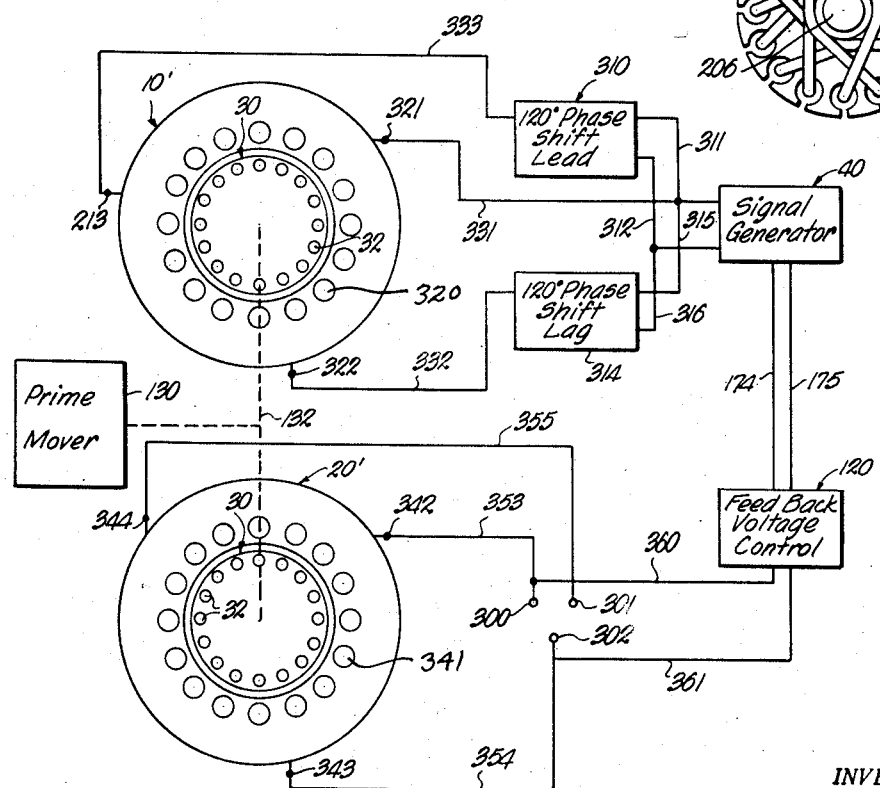

April 15, 1958  V. M. MATHEWS, JR., ET AL  2,831,156
AMPLIFYING ALTERNATOR
Filed Feb. 2, 1955  4 Sheets-Sheet 4
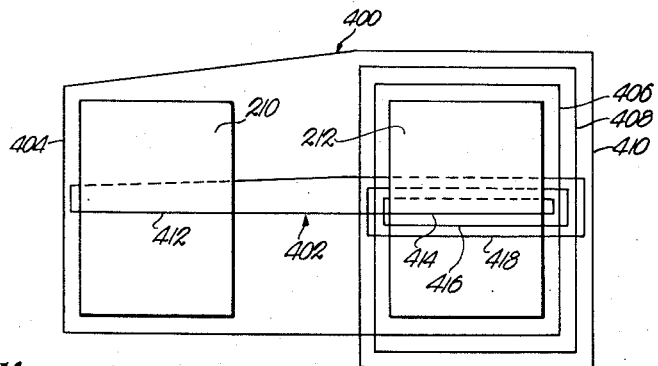
Fig. 10.
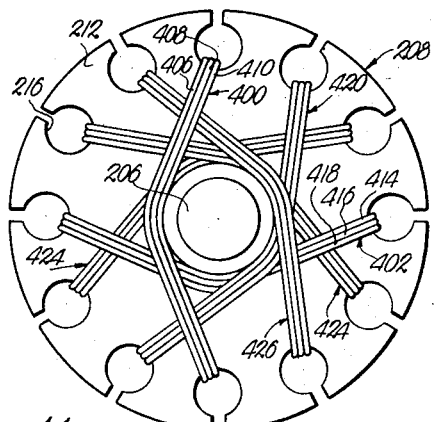
Fig. 11.
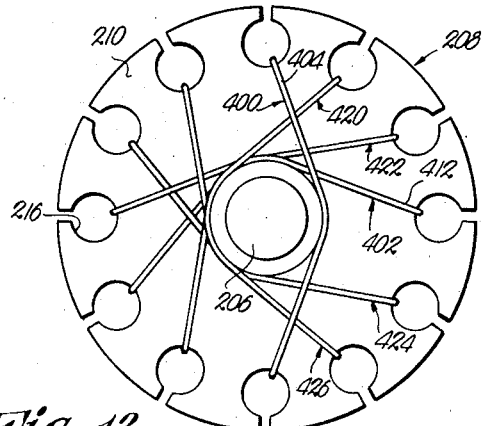
Fig. 12.
INVENTORS.
Victor M. Mathews, Jr.
Richard W. Fetter
BY
ATTORNEY.

United States Patent Office 2,831,156
Patented Apr. 15, 1958

2,831,156
AMPLIFYING ALTERNATOR

Victor M. Mathews, Jr., Kansas City, and Richard W. Fetter, Overland Park, Kans., assignors to Aermotive Equipment Corporation, Kansas City, Mo., a corporation of Delaware Application February 2, 1955, Serial No. 485,777

5 Claims. (Cl. 322—24)

This invention relates to the field of electrical machinery and, more particularly, to an improved form of alternator device and system by which an alternating current output of substantial amplitude can be produced from, and under the direct control as to frequency of, a source of alternating current signals of predetermined fixed or variable frequency but insufficient amplitude to satisfy the output requirements for which the device and system are to be used.

Previous types of electrical machinery for producing an alternating current output of substantial amplitude have all been subject to various disadvantages. For instance, the frequency of the output of conventional alternators is dependent upon the speed of mechanical rotation of an armature or the like and varies in accordance with variations in such speed of rotation. Another example is the necessity for using brushes or cummutator type contacts in conventional machinery of this general nature. Other disadvantages of and limitations upon the performance characteristics of conventional electrical machinery for producing such an alternating current output of precisely controlled frequency are too well known to those skilled in the art to require further elaboration here.

Accordingly, it is the primary object of this invention to provide alternator apparatus for overcoming all of the above-mentioned disadvantages and limitations and which has many additional advantages peculiar to its own principles of operation and construction.

It is another important object of this invention to provide alternator apparatus having a pair of separate stators each provided with windings and a single rotor having windings and which is common to both stators, the windings of one stator being adapted for excitation by an alternating current signal source of relatively low amplitude but precisely controlled, though either fixed or variable, frequency, the rotor being adapted for rotation by a prime mover, and the windings of the second stator being adapted to yield an alternating current output of increased amplitude and of precisely the same frequency as the frequency of the excitation applied to the windings of the first stator.

Another important object of the invention is to provide such apparatus including means for electrically exciting the windings of one stator to produce a rotating, magnetic field on such stator, mechanically rotating a rotor having windings and common to a second stator through the electrically rotated, magnetic field of the first stator to induce a resultant, electrically rotating field upon the windings of the rotor, and deriving from windings of the second stator an electrical output resulting from the windings of such second stator being subjected to the lines of flux of the rotating magnetic field resulting from the combined mechanical rotation of the rotor and the electrically produced rotation of the magnetic field induced thereon.

It is still another important object of this invention to provide such apparatus wherein the frequency of the output is independent of variations in the speed of rotation of the rotor.

It is still another important object of this invention to provide such apparatus wherein amplification of an excitation signal of limited amplitude applied to the first stator is accomplished by virtue of the transformation of the energy of mechanical rotation of a rotor formed of magnetic core material having windings and common both to such first stator and a second stator from which the amplified output is derived.

Still another important object of the invention is to provide such apparatus wherein the windings of the first stator may be adapted for excitation to produce a rotating, magnetic field on such stator by the interposition of phase shifting means between the excitation source and certain of such windings, and wherein the output windings used on the second stator may be such as to present a single phase, a three phase or some other multi-phase output, as desired.

Still another important object of the invention is the provision of such apparatus having a rotor provided with windings and common to both the excitation and output stators, which windings include a lesser number of turns disposed for rotation within the excitation stator than within the otuput stator, whereby an additional, transformer-like, voltage amplification is attained.

Many other important objects of the invention, including certain important details of construction, will be made clear or become apparent as the following description of the invention progresses.

In the accompanying drawings:

Fig. 5 is a side elevational view, with parts broken away and shown in cross section, of one form of the electromechanical alternator device forming an important part of the invention;

Fig. 6A and Fig. 6B are end elevational views of the rotor forming a part of the alternator device and illustrating two alternate ways in which the rotor windings may be connected at the ends of the rotor, Fig. 6A showing the windings commoned, and Fig. 6B showing the windings maintained in electrically isolated condition from one another;

Fig. 9 is a partially schematic and partially block diagram of another embodiment of alternator apparatus contemplated by the invention, which differs from the embodiment shown in Fig. 1 principally by the provision of three phase, distributed excitation and output windings on the two stators of the device;

Fig. 10 is a schematic illustration of a modified form of rotor windings by which further voltage amplification may be attained through transformer action;

Figure 1:
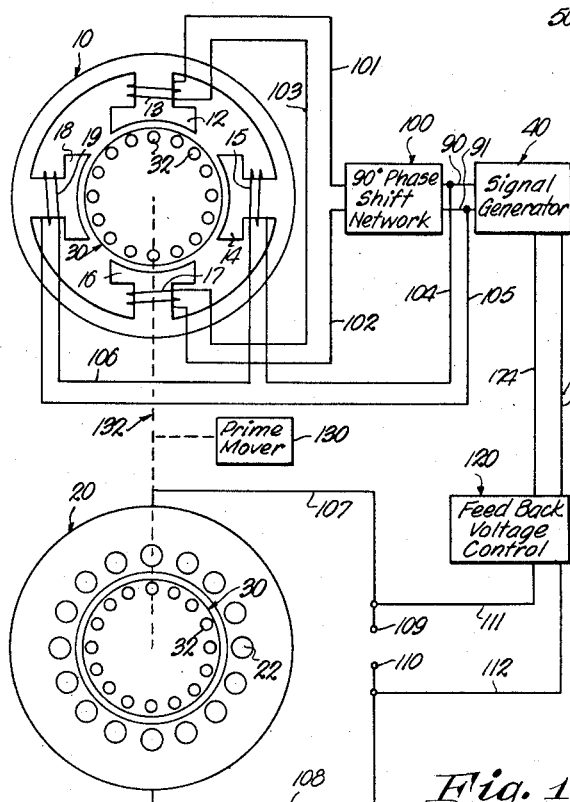
Figure 1 is a partially schematic and partially block diagram of one embodiment of the alternator apparatus of this invention.

Fig. 11 is an end elevational view of a rotor of an alternator device having transformer-like windings thereon of the kind schematically shown in Fig. 10, the end of the rotor illustrated being that adjacent the output stator of the device; and Fig. 12 is an end elevational view of the opposite end of the rotor shown in Fig. 11, the end illustrated in Fig. 12 being that which is adjacent the excitation stator of the device.

*Fundamental concepts*

It has been found that a stator of an electrical machine provided with certain types of windings can have such windings so excited by applied electrical signals as to electrically produce a magnetic field within such stator that is rotating relative to the physically stationary rotor. Examples of this are the provision of two pairs of pole windings offset from each other physically in a stator by right angles and electrically excited in phase quadrature, the provision of three pairs of pole windings offset from each other physically by angles of 120 degrees and excited by a three phase input, or the provision of other multiphase windings excited in accord with their physical disposition within the stator. The speed of rotation in stators of magnetic fields so produced is found to equal the electrical frequency of the applied excitation.

Moreover, if a rotor having a number of closed-loop windings, for instance, is disposed within a stator in which such a rotating magnetic field is present, it is found that the subjection of such windings to the lines of flux of such rotating magnetic field of the stator will induce in the windings a flow of alternating current. Obviously, when the rotor is stationary, such current so induced in the rotor windings will be alternating at the same frequency as the speed of rotation of the stator field, with the current in various windings of the rotor relatively phased in accordance with their respective physical positions relative to each other, the actual instantaneous phasing on each rotor winding being, of course, dependent upon its disposition relative to the stator or, more precisely, the instantaneous rotated position of the stator field.

It has been further discovered, however, that if the rotor is mechanically rotated by operable coupling with a suitable prime mover, the frequency of alternation of the current induced in the rotor windings will be the algebraic resultant of the speed of electrically produced rotation of the stator field and the speed of mechanical rotation of the rotor, when rotations in opposite directions are considered as of like sign (or additive) and rotations in the same direction are considered as of unlike sign (or subtractive). To illustrate, assume that the frequency of the excitation, and therefore the speed of rotation of the stator field, is indicated by S, that the speed of rotation of the rotor is indicated by R, and that the frequency of the current induced in the rotor windings is indicated by F. When the rotations are in opposite directions, F equals S plus R; when the rotations are in the same direction and S is greater than R, F equals S minus R; and when the rotations are in the same direction and R is greater than S, F equals R minus S. It will be seen to necessarily follow that the induced rotor current of frequency F results in the production by the rotor windings of a magnetic field which is rotating relative to the rotor at a speed equal to F.

Now assume that a second or output stator having, for instance, a conventional, single phase, distributed winding is provided and so disposed that the above-mentioned rotor is common to such output stator and the first-mentioned excitation stator. It will be clear that, although the magnetic field of the rotor is rotating at a resultant speed equal to F relative to the rotor, the rotor is also rotating physically relative to the output stator at a speed equal to R.

Consideration of such facts will confirm the logic of the observed result that, since the R component of the speed of the rotor's rotating magnetic field is of the same direction and magnitude as the mechanical rotation of the rotor at speed R (referring both to the output stator), their effects upon the output stator cancel and an alternating current output is induced in the winding of the output stator of frequency precisely equal to S. It is most significant, first, that such frequency of the output is exactly the same as that of the input, and secondly, that such result is entirely independent of the magnitude of the speed of mechanical rotation of the rotor (R) or any variations therein. It will also be noted that the output frequency will follow the excitation frequency not only when the latter is fixed, but also when it is varied; this fact means that the apparatus will provide an output of either fixed or variable frequency and of frequency stability essentially as good as that of any low power excitation source which may be utilized.

Particularly when it is recognized that amplification is inherent in the device from the generator action resulting from the energy of mechanical rotation of the rotor and from the magnetic field action resulting from the magnetic core material used for the rotor, it will be clear that the apparatus of the invention is adapted for use in varied applications too numerous to recite. Such amplification feature of the apparatus may be further accomplished and enhanced by means of employing transformer-like windings on the rotor, with the result that, from excitation of a power magnitude such as available from a crystal controlled or other precise frequency, electronic oscillator, the alternator of this invention can provide the power required by a substantial arrangement of power consuming instruments or the like at a precisely controlled frequency required by the latter.

*Illustrative construction*

Referring first to Fig. 1, the numeral 10 generally designates an excitation stator having four pole pieces 12, 14, 16 and 18, poles 12 and 16 being in direct opposition, poles 14 and 18 being in direct opposition, and there being a 90° angular spacing between successive poles 12, 14, 16 and 18. Pole 12 is provided with a winding 13, pole 14 with a winding 15, pole 16 with a winding 17 and pole 18 with a winding 19.

The numeral 20 generally designates a second or output stator having a winding 22 thereon which, in the illustrated embodiment, may be any conventional, distributed, single phase type winding.

A rotor generally designated 30 is common to stators 10 and 20 and has a plurality of closed loop windings 32 which are also magnetically common to both of stators 10 and 20, since they extend around the opposite extremities of rotor 30 disposed respectively within stators 10 and 20.

Figure 3A:
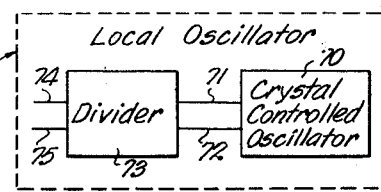
Figs. 3A, 3B, 3C, 3D and 3E are further detailed, block diagrams of alternative forms of local oscillator which may form a part of the signal generator utilized in the alternator apparatus.
Figure 3B:
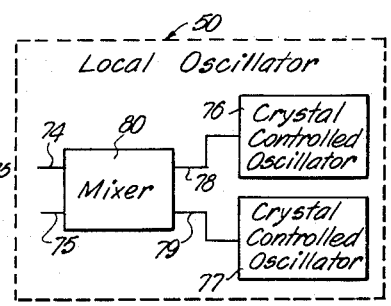
Figure 3C:
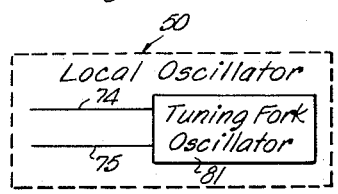
Figure 3D:
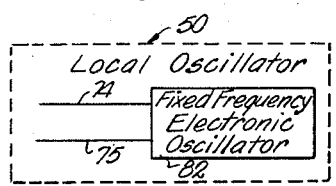
Figure 2:
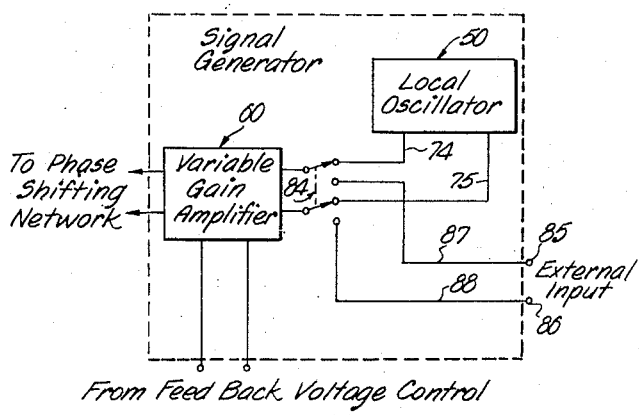
Fig. 2 is a more detailed, essentially block diagram of a signal generator such as may form a part of the alternator apparatus of the invention.
Figure 3E:
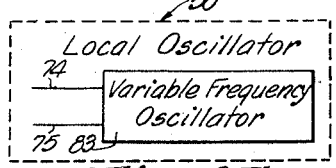

A signal generator generally designated 40 may be of various constructions but preferably includes a local oscillator 50, and a variable gain amplifier 60, as illustrated in Fig. 2. The local oscillator 50 may, in turn, be of various constructions, a number of which are illustrated in Figs. 3A to 3E inclusive. In Fig. 3A, the local oscillator 50 is illustrated as comprising a conventional crystal controlled electronic oscillator 70 whose output is coupled through conductive means 71 and 72 to an electronic frequency divider 73 whose output is delivered to a pair of output lines 74 and 75 (the divider 73 being required only when the frequency of the output to lines 74 and 75 must be reduced from that produced by the crystal controlled oscillator 70). In Fig. 3B, the local oscillator 50 is comprised of a pair of crystal controlled electronic oscillators 76 and 77 whose outputs are coupled by conductive means 78 and 79 to an electronic heterodyne mixer 80 which furnishes an output of frequency equal to the difference between the frequencies of oscillators 76 and 77 to output lines 74 and 75 (the mixer 80 being provided with filtering means which are not shown for eliminating the sum and other undesired components of the heterodyne output). In Fig. 3C, the local oscillator 50 is illustrated as comprising a tuning fork controlled oscillator 81 whose output is fed to lines 74 and 75. In Fig. 3D, the local oscillator 50 consists of a fixed frequency electronic oscillator 82, which it will be understood could be of the Wein bridge or any other suitable type having high frequency stability, the output of such oscillator 82 being fed to lines 74 and 75. In Fig. 3E, the local oscillator 50 is illustrated as a variable frequency electronic oscillator 83 having its output coupled with lines 74 and 75, it being obvious to those skilled in the art that the oscillator 83 could be of various types well known in the art.

Referring back to Fig. 2 it will be seen that local oscillator output lines 74 and 75 may be coupled with the variable gain amplifier 60 through a switch broadly designated 84 by which an external input coupled with terminals 85 and 86 may be connected with the amplifier 60 through lines 87 and 88, when it is desired to utilize such an external input, rather than the signal produced by the local oscillator 50.

The output from variable gain amplifier 60 is fed through lines 90 and 91 to a phase shifting network generally designated 100, and which, in the embodiment of Fig. 1, constitutes any conventional means for shifting the phase of the output from signal generator 40 by ninety (90) electrical degrees. The output from phase shifting network 100 is coupled by lines 101 and 102 with stator windings 13 and 17 respectively, windings 13 and 17 being in turn interconnected by line 103. The output from signal generator 40 is also directly coupled, without phase shifting, by lines 104 and 105 with windings 15 and 19 respectively, such windings 15 and 19 being in turn interconnected by a line 106. It will thus be obvious that, in the embodiment of Fig. 1, the windings 13, 15, 17 and 19 are fed in phase quadrature with a signal produced by and of the frequency determined by signal generator 40.

The output from winding 22 of stator 20, which in the illustrated embodiment of Fig. 1 is a single phase, alternating current output, is delivered by lines 107 and 108 to output terminals 109 and 110. Such output delivered through lines 107 and 108 is sampled by lines 111 and 112 which delivers the same to feed back voltage control means generally designated 120. The purpose of feed back voltage control means 120, as will hereinafter become more fully apparent, is to compensate for any variations in amplitude of the output delivered to terminals 109 and 110 resulting from variations in output load and/or in the speed at which the prime mover 130 is rotating rotor 30 through mechanical coupling means generally indicated by the dotted lines 132 in Fig. 1. As has already been explained, the frequency of the output delivered to terminals 109 and 110 is independent of the speed of rotation of rotor 30; however, variations in load or in such speed of rotation may result in variations in output amplitude which in certain applications should be compensated for as by the feed back voltage control means 120, the latter being therefore understood to be somewhat optional, rather than essential.

Figure 4:
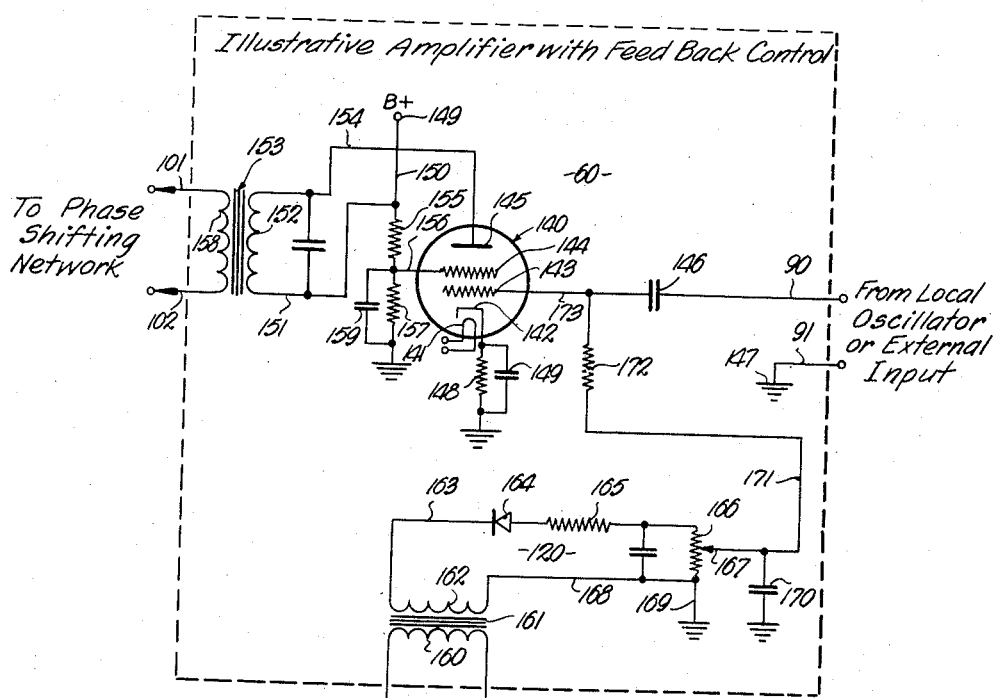
Fig. 4 is a more detailed schematic diagram of one form of variable gain amplifier and feed back voltage control means for use as a part of the signal generator.

Referring next to Fig. 4 there is illustrated schematically suitable structure for the variable gain amplifier 60 and the feed back voltage control means 120. The amplifier 60 comprises a vacuum tube 140 having a heater 141, a cathode 142, a control grid 143, a screen grid 144 and a plate 145. Line 90 from the signal generator 40 is coupled through a capacitor 146 with control grid 143. Line 91 from signal generator 40 is preferably grounded as at 147. Heater current is supplied to heater 141 in conventional manner by means not shown. Cathode 142 is grounded through a cathode biasing resistor 148 and bypassed by a capacitor 149. A positive operating potential is supplied from a B-plus terminal 149 through conductors 150 and 151, a primary 152 of an output transformer generally designated 153 and a conductor 154 to plate 145. A positive operating potential is also supplied from terminal 149 through conductor 150, a screen resistor 155 and a conductor 156 to screen grid 144, grid 144 being grounded through a second resistance 157 and bypassed by a capacitor 159. Transformer 153 is provided with a secondary 158 which is coupled with lines 101 and 102.

To vary the gain of the amplifier 60 just described, in order to compensate for variations in the amplitude of the output at terminals 109 and 110, lines 111 and 112 from the stator winding 22 are coupled with the primary 160 of a transformer 161 having a secondary 162. The circuit for secondary 162 is completed through a conductor 163, a rectifying device 164, a resistance 165, a potentiometer 166 having a tap 167, and a conductor 168, the latter being preferably grounded as at 169. The tap 167 of potentiometer 166 is by-passed to ground by a capacitor 170 and coupled by a conductor 171, a resistance 172 and a conductor 173 with control grid 143 of tube 140.

It will be clear to those skilled in the art that the output presented at terminals 109 and 110 is sampled and delivered by lines 111 and 112 to the primary 160 of transformer 161. The output of secondary 162 of transformer 161 is then rectified by the series, secondary circuit described, and the rectified output delivered to control grid 143 for controlling the bias thereon. In view of the adjustability of tap 167 on potentiometer 166 it will be clear to those skilled in the art that the bias maintained on grid 143 of tube 140 relative to the bias maintained on cathode 142 thereof by resistor 148 may be varied by the rectified "error" signal from lines 111 and 112 to control the gain of tube 140. Since it is the output from tube 140 that excites the windings 13, 15, 17 and 19 of stator 10, and since an increase in amplitude of the output at terminals 109 and 110 will result in increasing the bias upon tube 140 and thereby decreasing its gain, it will be clear that the excitation supplied to stator 10 will be decreased to compensate for such increase in output at terminals 109 and 110. As will be clear to those skilled in the art, when the variable gain amplifier 60 and its feed back control means 120 are operating in their normal fashion, an equilibrium condition will be maintained that prevents any substantial variation in amplitude of the output at terminals 109 and 110 resulting from any reasonable variations in the output load or speed of rotation of rotor 30 or from other causes. It should also be noted, that compensating windings (not shown) may be provided on both of stators 10 and 20 for offsetting any undesired phasing or amplitude effects, which may result from undesired back induction between rotor windings 32 and the stator windings 13, 15, 17, 19 and 22. Since the provision of such compensating windings will depend upon the particular types of stator windings employed, and since the manner of providing same is well understood to those skilled in the art, it is not deemed necessary to elaborate further concerning same.

It may be observed that, in Fig. 1, the connections which are indicated by the numerals 174 and 175 correspond to the couplings illustrated in Fig. 4 by the conductor 171, the resistance 172 and the conductor 173 and the common ground utilized for both the amplifier and rectifier portions of the illustrated circuitry. It will now be clear that the structure illustrated in Fig. 1 and shown in greater detail in Figs. 2, 3 and 4, presents what may be deemed the currently preferred construction of the invention, it being noted that the local oscillator illustrated in Fig. 3A is the currently preferred form of fixed frequency signal source, although the latter choice is obviously subject to the particular application in which the apparatus is to be used and, more particularly, the output frequency desired.

Referring next to Fig. 5 there is shown an illustrative physical construction of a device broadly designated 200 having a housing including a shell or casing 201 and end pieces 202 and 203. Rotatably mounted within end pieces 202 and 203 by bearings 204 and 205 is a rotor shaft 206, which extends beyond one end piece 202 for operable connection with the prime mover 130. There is provided upon rotor shaft 206 a rotor armature generally designated 208, preferably comprised of an end section 210 of laminated iron or other magnetic material, an opposite end section 212 likewise composed of laminated iron or the like, and an intermediate section 214 of non-magnetic material for magnetically isolating the end sections 210 and 212 of rotor 208. All of sections 210, 212 and 214 are provided with a plurality of circumferentially spaced, elongated, longitudinal slots 216, which may be of any conventional form adapted to receive the conductors (not shown in Fig. 5) forming the windings upon rotor 208. An excitation stator 218, which may also be formed of laminated iron in conventional fashion, is provided in surrounding relationship to end section 210 of rotor 208, and a second or output stator 220 of similar construction is provided in surrounding relationship to rotor end section 212. As above indicated, the windings upon excitation stator 218 and output stator 220 may be of any conventional types adapted for producing a rotating magnetic field upon stator 218 and for deriving an output of the desired phasing from output stator 220.

As illustrated in Fig. 6A the windings on rotor 208 may consist of a loop of conductive material 222 passing longitudinally through each of the aligned slots 216 in sections 210, 212 and 214 with such conductors or windings 222 having their ends commoned as by an annular interconnection 224 in surrounding relationship to the shaft 206. Alternately, as illustrated in Fig. 6B, each of the winding conductors 222 may comprise a single closed loop extending through opposite slots 216 and formed at the ends of rotor 208 to pass around the shaft 206. In such construction of Fig. 6B, the individual closed loop windings 222 are electrically isolated from one another, this construction being currently preferred. It is noted, however, that the physical construction shown in Fig. 6A is somewhat more convenient from a manufacturing viewpoint and will yield perfectly satisfactory results. It may be further noted that each of the winding loops 222 may actually consist of a plurality of turns of wire, if desired.

Figure 7:
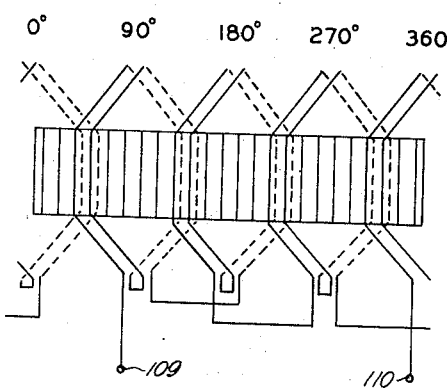
Fig. 7 is an essentially diagrammatic illustration of the relative placement of one form of distributed, single phase windings upon the output stator of the alternator device, with such windings being shown as if the stator were in "unrolled" condition, and being of the lap wound, distributed, full pitch type.

Referring next to Fig. 7 there is illustrated in the usual diagrammatic form, a conventional lap wound, distributed winding for output stator 220, for use when a single phase alternating current output is desired at terminals 109 and 110. Since it is perceived that the illustration would only be confused by the addition of numerals to the continuous winding, it may be merely noted that the degree numerals at the top of the figure indicate the relative angular displacement of the various parts of the winding upon the stator 220, the latter being assumed to be in "unrolled condition."

Figure 8:
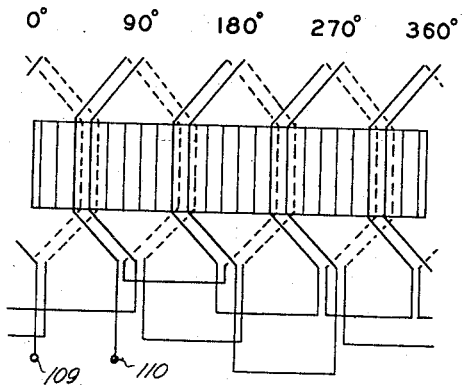
Fig. 8 is a view similar to that of Fig. 7, but illustrating the windings of the output stator as of the wave wound, distributed, full pitch type.

Similarly, Fig. 8 illustrates another type of distributed winding of the wave wound form for use on the stator 220. Either type has been found satisfactory, although the lap wound winding illustrated in Fig. 7 is currently preferred.

Fig. 9 illustrates another embodiment of the invention which operates on exactly the same principles as those utilized in the embodiment of Fig. 1. Corresponding numerals in Fig. 9 indicate the same or corresponding parts to those illustrated and described in connection with Fig. 1, the only substantial differences being that the embodiment of Fig. 9 is adapted to produce a 3-phase, alternating current output for delivery to 3-phase terminals 300, 301 and 302 and, for purposes of further illustrating the principles of the invention only, is constructed to derive such output from a 3-phase excitation. In this construction, the output from signal generator 40 is coupled with a 120° lead phase shifting network generally designated 314 by conductive means 315 and 316. The excitation stator 10' is in this case provided with a three-phase distributed winding 320 having terminals 321, 322 and 323. Terminal 321 is coupled directly with signal generator 40 through conductive means 331, while the other terminals 322 and 323 are respectively coupled with the lag network 314 and the lead network 310 through conductors 332 and 333.

The output stator 20' may be provided with any conventional type of 3-phase output winding, that shown for purposes of illustration being a three-phase distributed winding 341 having terminals 342, 343 and 344. Terminal 342 is coupled with output terminal 300 through conductive means 353, terminal 343 is coupled with output terminal 302 through line 354, and terminal 344 is coupled with output terminal 301 by line 355. The amplitude of the output is sampled by lines 360 and 361 coupling the feed back voltage control means 120 to any two of the output terminals 300, 301 and 302, terminals 300 and 302 having been chosen for illustration.

It should be clear from a consideration of the principles of operation of the invention, in the light of the illustrative embodiments of Figs. 1 and 9, that various phasing can be used on both of stators 10 and 20, and that such phasings need not be the same. In other words, any excitation windings for stator 10 capable of providing a rotating magnetic field thereon will be satisfactory, while the windings to be used on stator 20 will depend only upon the type of phasing desired in the output.

Referring now to Figs. 10, 11 and 12, there is illustrated a modified construction for the rotor 208 wherein each of the closed loop windings extending around sections 210 and 212 of rotor 208 includes a greater number of turns around the section 212 than around the section 210. This is diagrammatically indicated in Fig. 10 with respect to two closed loops generally designated 400 and 402, it being understood that windings 400 and 402 represent only two of a greater plurality of such windings preferably provided.

As will be clear from Fig. 10, closed loop winding 400 has a single turn 404 passing about rotor section 212 and a plurality of turns 406, 408 and 410 passing about rotor section 212. Similarly, winding 400 has a single turn 412 on rotor section 210 and a plurality of turns 414, 416 and 418 on rotor section 212. Clearly, this gives a transformer action between the rotor sections 210 and 212, by virtue of the greater number of turns of the windings 400 and 402 upon rotor section 212, resulting in further amplification.

Fig. 11 illustrates a possible configuration of the conductors upon the end of rotor section 212 remote from 210. Specifically identified are the turns 406, 408 and 410 of conductor 400 and the turns 414, 416 and 418 of the conductor 402, it being observed that a number of other conductors generally designated 420, 422, 424 and 426 are also provided. The multiple turns of each of the conductors 400 et seq. are passed around the rotor section 212 through the slots 216 thereof, with each conductor being bent around the rotor shaft 206 and passing from one slot 216 to the opposite slot 216.

Fig. 12 illustrates the rotor section 210 looking at the end thereof remote from section 212, the disposition of the single turns 404 and 412 of conductors 400 and 402 being obvious, as well as the similar disposition of the single turns of conductors 420, 422, 424 and 426.

It will be understood that the number of slots 216 provided on sections 210 and 212 of rotor 208, and therefore the number of conductors 400 et seq. may, and preferably is, increased over the number of same shown in the drawings for illustrative purposes. It will also be understood that such transformer-like construction of windings 400 et seq. upon the rotor 208, although a desirable and advantageous feature of this invention, is optional rather than absolutely necessary for advantageous utilization of the fundamental concepts contemplated by the invention.

It will thus be apparent that the illustrative structure described and shown not only provides means for fully accomplishing all of the stated objectives of the invention, but also indicates that, within reasonable limits, changes and modifications may be made in certain details of construction without departing from the true spirit and intention of the invention. Accordingly, the invention is to be deemed limited only within the scope of the appended claims.

Having thus described the invention, what is claimed as new and desired to be secured by Letters Patent is:

1. Electrical apparatus comprising, in combination, first means for producing a first magnetic field; second means having a pair of electrically and mechanically intercoupled portions, one of said portions being within said first field, the other of said portions being outside said first field, said one portion being adapted for producing a flow of electrical current in both portions responsive to any shifting of said first field relative to said one portion, said other portion being adapted for producing a second magnetic field responsive to any flow of electrical current in said other portion; third means disposed to be within said second field whenever the latter is produced, said third means being adapted for producing an electrical output responsive to any shifting of said second field relative to said third means; fourth means for shifting said first field in one direction relative to a frame of positional reference; and fifth means for shifting said second means in an opposite direction relative to said frame of reference and said third means, whereby said output is amplified by generator action.

2. Alternator apparatus comprising, in combination, first means for producing a first magnetic field; second means having a pair of electrically and mechanically intercoupled portions, one of said portions being within said first field, the other of said portions being outside said first field, said one portion being adapted for producing a flow of electrical current in both portions responsive to any shifting of said first field relative to said one portion, said other portion being adapted for producing a second magnetic field responsive to any flow of electrical current in said other portion; third means disposed to be within said second field whenever the latter is produced, said third means being adapted for producing an electrical output responsive to any shifting of said second field relative to said third means; fourth means for cyclically shifting said first field relative to a frame of positional reference; and fifth means for cyclically shifting said second means relative to said frame of reference, and said third means oppositely to said shifting of the first field relative thereto, whereby said output is amplified by generator action and is of cyclical character independent of the speed of cyclic shifting of the second means.

3. Alternator apparatus comprising, in combination, first means for producing a first magnetic field; second means having a pair of electrically and mechanically intercoupled portions, one of said portions being within said first field, the other of said portions being outside said first field, said one portion being adapted for producing a flow of electrical current in both portions responsive to any rotation of said first field relative to said one portion, said other portion being adapted for producing a second magnetic field responsive to any flow of electrical current in said other portion; third means disposed to be within said second field whenever the latter is produced, said third means being adapted for producing an electrical output responsive to any rotation of said second field relative to said third means; fourth means for rotating said first field in one direction relative to a frame of positional reference; and fifth means for rotating said second means in an opospite dierction relative to said frame of reference and said third means, whereby said output is amplified by generator action and is of alternating current character and of frequency independent of the speed of rotation of the second means.

4. Alternator apparatus comprising, in combination, first means including a stator having conductive winding structure, an alternating current signal generator having a variable gain output amplifier, and circuitry coupling the generator amplifier with the winding structure for producing a first magnetic field rotating in one direction relative to a frame of positional reference; second means having a pair of electrically and mechanically intercoupled portions, one of said portions being within said first field, the other of said portions being outside said first field, said one portion being adapted for producing a flow of electrical current in both portions responsive to any rotation of said first field relative to said one portion, said other portion being adapted for producing a second magnetic field responsive to any flow of electrical current in said other portion; third means disposed to be within said second field whenever the latter is produced, said third means being adapted for producing an electrical output responsive to any rotation of said second field relative to said third means; fourth means for rotating said second means in an opposite direction relative to said frame of reference and said third means; and feedback means coupling said third means with said generator amplifier for controlling the gain of the latter in accordance with the amplitude of the output of said thrid means, whereby said output is amplified by generator action, is maintained at a substantially constant level and is of alternating current character and of frequency independent of the speed of rotation of the second means.

5. Alternator apparatus comprising, in combination, first means including a mechanically stationary stator provided with conductive winding structure adapted for phased excitation, an alternating current signal generator, and means including circuitry directly connecting said generator with a portion of said structure and phase shifting means coupling said generator with another portion of said structure for phasing the structure to produce a first magnetic field which is electrically rotating relative to a frame of positional reference; second means having a pair of electrically and mechanically intercoupled portions, one of said portions being within said first field, the other of said portions being outside said first field, said one portion being adapted for producing a flow of electrical current in both portions responsive to any rotation of said first field relative to said one portion, said other portion being adapted for producing a second magnetic field responsive to any flow of electircal current in said other portion; third means disposed to be within said second field whenever the latter is produced, said third means being adapted for producing an electrical output responsive to any rotation of said second field relative to said third means; and fourth means for rotating said second means relative to said frame of reference and said third means.

References Cited in the file of this patent

UNITED STATES PATENTS

| | | |
|---|---|---|
| 1,104,257 | Goldschmidt | July 21, 1914 |
| 2,659,044 | MacNeil | Nov. 10, 1953 |